United States Patent [19]

Shibahata et al.

[11] Patent Number: 4,640,379
[45] Date of Patent: Feb. 3, 1987

[54] VEHICLE STEERING CONTROL SYSTEM

[75] Inventors: Yasuji Shibahata, Yokohama; Yasumasa Tsubota, Yokosuka; Takaaki Uno, Zama, all of Japan

[73] Assignee: Nissan Motor Co., Ltd., Japan

[21] Appl. No.: 661,070

[22] Filed: Oct. 15, 1984

[30] Foreign Application Priority Data

Oct. 27, 1983 [JP] Japan .................. 58-166592[U]

[51] Int. Cl.$^4$ .................................................. B62D 5/06
[52] U.S. Cl. .................................... 180/140; 180/143
[58] Field of Search ............... 180/140, 143, 234, 236, 180/132, 148

[56] References Cited

U.S. PATENT DOCUMENTS

| | | | |
|---|---|---|---|
| 4,105,086 | 8/1978 | Ishii et al. | 180/143 X |
| 4,313,514 | 2/1982 | Furukawa et al. | 180/143 |
| 4,398,616 | 8/1983 | Braden | 180/140 |
| 4,412,594 | 11/1983 | Furukawa et al. | 180/140 |
| 4,441,572 | 4/1984 | Ito et al. | 180/140 |
| 4,457,390 | 7/1984 | Abe et al. | 180/143 X |

FOREIGN PATENT DOCUMENTS

| | | |
|---|---|---|
| 0089631 | 9/1983 | European Pat. Off. . |
| 2128491 | 12/1971 | Fed. Rep. of Germany . |
| 3338702 | 5/1984 | Fed. Rep. of Germany . |

Primary Examiner—Allen M. Ostrager
Attorney, Agent, or Firm—Leydig, Voit & Mayer

[57] ABSTRACT

A vehicle is equipped with a power steering control system and a compliance steer control system. Hydraulic fluid pressurized by a hydraulic pump is controlled in pressure by a fluid control valve, and the thus controlled hydraulic fluid is selectively directed through a directional control valve to at least one of the power steering system and the compliance steer control system in accordance with vehicle speed, thereby stopping fluid supply to the power steering system in a high vehicle speed range while to the compliance steer control system in a low vehicle speed range.

13 Claims, 7 Drawing Figures

VEHICLE STEERING CONTROL SYSTEM

BACKGROUND OF THE INVENTION

1. Field of the Invention

This invention relates to a vehicle steering control system composed of front wheel operating means such as a power steering system and a rear wheel control means such as a compliance steer control system, and more particularly to an improvement in such a steering control system to selectively supply hydraulic fluid under pressure to the front wheel operating means and the rear wheel control means.

2. Description of Prior Art

In order to improve cornering performance in modern automotive vehicles, a vehicle steering control system has been proposed in which so-called compliance steer of rear wheels is controlled by a compliance steer control system under the action of hydraulic fluid to be supplied to a power steering system. Such a vehicle steering control system is disclosed, for example, in U.S. Pat. No. 4,440,254 issued on Apr. 3, 1984 in the name of Shibahata et al.

This vehicle steering control system is composed of a pressure control valve for controlling pressurized hydraulic fluid in response to the rotation of a steering wheel. The hydraulic fluid controlled by the pressure control valve is supplied to a power cylinder of a power steering system to develop a steering assist power for turning front wheels in the same direction as steering wheel rotation thereby to reduce a steering effort to be applied to the steering wheel. The controlled hydraulic fluid is also supplied to actuators of a compliance steer control system to turn rear wheels in the same direction as steering wheel rotation thereby to reduce toe-out phenomena of the rear wheels caused by side force applied to the rear wheels during vehicle cornering, thus attaining vehicle stability during high speed cornering.

Now, it will be understood that, during low vehicle speed cruising, it is necessary to supply hydraulic fluid to the power cylinder of the power steering system in order to power-assist turning front wheels against a higher resistance between the front wheels and road; however, it is not necessary to supply the hydraulic fluid to the actuators of the compliance steer control system since the side force applied to the rear wheels is smaller. Conversely, during high vehicle speed cruising, the side force applied to the rear wheels becomes greater and therefore it is necessary to supply the hydraulic fluid to the actuators thereby to decrease the toe-out phenomena due to the side force; however, the power cylinder is not necessary to be supplied with the hydraulic fluid since the driven speed of the front wheels is sufficiently high relative to its turning speed for steering, thus reducing apparent resistance between the front wheels and road.

In constrast with this, with the above-mentioned conventional vehicle steering control system, the power cylinder of the power steering system and the actuators of the compliance steer control system are unavoidably simultaneously operated because the same controlled hydraulic fluid is directly supplied to both of them. Accordingly, the actuators are unnecessarily operated at a low vehicle speed, while the power cylinder is unnecessarily operated at a high vehicle speed. As a result, a greater power is required to drive a hydraulic pump for supply the power cylinder and the actuators with pressurized hydraulic fluid, thus deteriorating fuel economy.

SUMMARY OF THE INVENTION

A vehicle steering control system of the present invention is composed of a fluid control valve for controlling hydraulic fluid supplied under pressure from a hydraulic pump in response to the rotation of a steering wheel. The hydraulic fluid controlled by the control valve is suppliable to a front wheel operating means such as a power steering system and a rear wheel control means such as a compliance steer control system. A directional control means is provided to selectively direct the controlled hydraulic fluid from the fluid control valve to at least one of the front wheel operating means and the rear wheel control means in accordance with a vehicle operating parameter such as vehicle speed.

Accordingly, hydraulic fluid supply to the front wheel operating means is stopped at a high vehicle speed range while hydraulic fluid supply to the rear wheel control means is stopped in a low vehicle speed range, thereby reducing load to the hydraulic pump while improving fuel economy.

BRIEF DESCRIPTION OF THE DRAWINGS

The features and advantages of the vehicle steering control system of the present invention will be more clearly appreciated from the following description taken in conjunction with the accompanying drawings in which like reference numerals designate like parts and elements, in which.

DETAILED DESCRIPTION OF THE INVENTION

Figure 1:
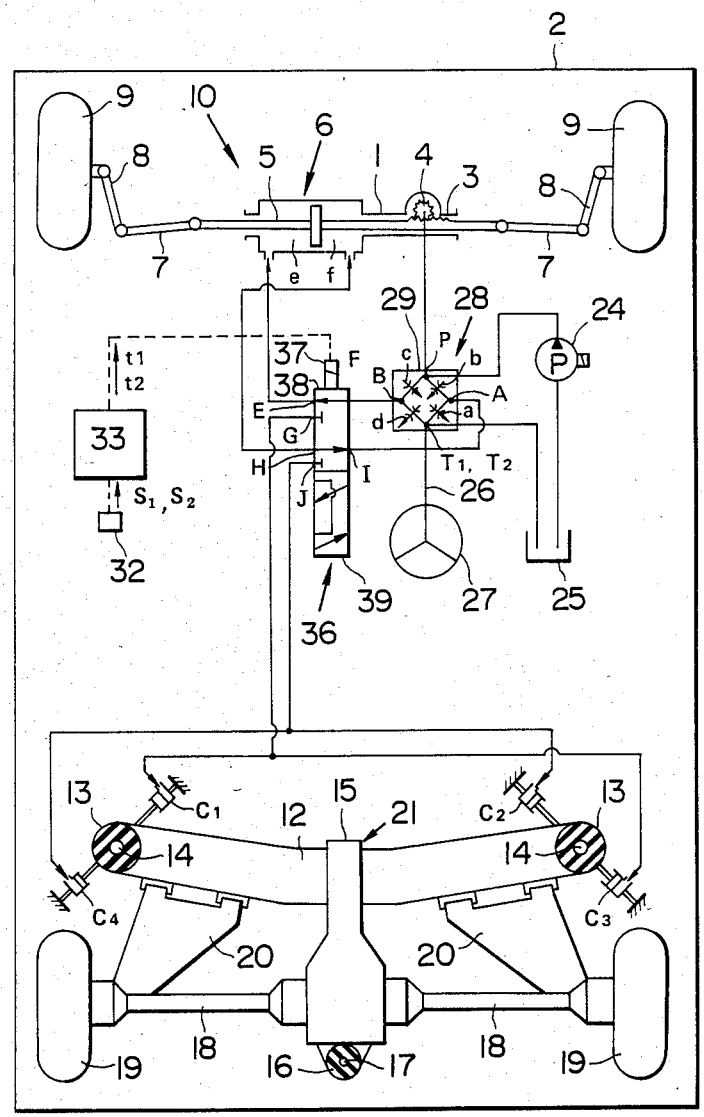
FIG. 1 is a schematic plan view of a first embodiment of the vehicle steering control system in accordance with the present invention.

Referring now to FIG. 1, a first embodiment of a vehicle steering control system according to the present invention is illustrated in cooperation with, for example, an automotive vehicle whose body is designated by the reference numeral 2. The steering control system comprises a steering gear (no numeral) including a rack (rack gear) 3 and a pinion gear 4 both disposed in a gear housing 1. The rack 3 is slidably movable in the widthwise direction of the vehicle body 2 and in mesh with the pinion gear 4. The gear housing 1 is provided at its one end with a power cylinder 6 forming part of a front wheel operating means or power steering system 10. A part of the rack 3 serves as a piston rod 5 of the power cylinder 6. Each of one end of the piston rod 5 and the other end of the rack 3 is connected through a side rod 7 and a knuckle arm 8 with a front wheel 9.

A rear suspension member 12 extends in the widthwise direction of the vehicle body 2 and elastically supported at its opposite end sections on the vehicle body 2 in such a manner that each of the opposite end sections of the rear suspension member is connected through an elastomeric insulator 13 to a pin 14 secured to the vehicle body 2. A differential gear housing 15 is fixed at its front end section to a central section of the rear suspension member 12 and elastically supported at its rear end section on the vehicle body 2 in such a manner as to be connected through an elastomeric insulator 16 to a pin 17 secured to the vehicle body 12. Drive shafts 18 projected from the differential gear housing 15 are respectively connected with rear wheels 19 which are pivotally supported to the rear suspension member 12 through semi-trailing arms 20 respectively. Each of hydraulic cylinders $C_1$, $C_2$, $C_3$, $C_4$ is mechanically interposed between the rear suspension member 12 and the vehicle body 2 in which each hydraulic cylinder includes a cylinder section connected to the vehicle body 2 by means of a pin joint, and a piston section connected to the rear suspension member 12 by means of a pin joint. The hydraulic cylinders $C_1$, $C_2$, $C_3$, $C_4$ form part of a rear wheel control means or compliance steer control system 21. The compliance steer control system 21 is disclosed in detail in U.S. Pat. No. 4,440,254 and therefore the detailed explanation thereof will be omitted for the purpose of simplicity of illustration.

A pump 24 is provided to pressurize hydraulic fluid from a reservoir tank 25 to supply the hydraulic fluid under pressure to required portions of the vehicle steering control system, forming part of means for providing hydraulic fluid under pressure. A steering wheel 27 is fixedly mounted on a steering shaft 26 with which a fluid or pressure control valve 28 of a rotary type is incorporated, the control valve being located between the steering wheel 27 and the pinion gear 4. The pressure control valve 28 has a valve housing 29 which is formed with ports A, B, P, $T_1$ and $T_2$. A valve shaft (not shown) is rotatably disposed within the valve housing 29. Variable orifices a, b, c and d are formed between the valve housing 29 and the valve shaft in which the port P and the port A are communicable with each other through the orifice b, the port P and the port B are communicable with each other through the orifice c, the port $T_1$ and the port A are communicable with each other through the orifice a, and the port $T_2$ and the port B are communicable with each other through the orifice d. The flow passage areas of the respective variable orifices a, b, c and d are equal when the steering wheel 27 is in its neutral or straight ahead position. However, when the steering wheel 27 is rotated in one direction, the flow passage area of the variable orifices a and c increases while the flow passage area of the variable orifices b and d decreases. Conversely, when the steering wheel 27 is rotated in the opposite direction to the above-mentioned one direction, the flow passage area of the variable orifices b and d increases while the flow passage area of the variable orifices a and c decreases. The port P is fluidly connected to a discharge port (not identified) of the hydraulic pump 24. The ports $T_1$ and $T_2$ are fluidly connected to the reservoir tank 25.

A vehicle speed sensor 32 is provided to output different signals in response to vehicle speeds. More specifically, the vehicle speed sensor 32 is adapted to output to a control circuit 33 a signal $S_1$ when the vehicle cruises at a low vehicle speed range (lower than a predetermined vehicle speed level $V_1$) while a signal $S_2$ when the vehicle cruises at a high vehicle speed range (not lower than the vehicle speed level $V_1$) which is higher in vehicle speed than the low speed range. The control circuit 33 is arranged to output to a solenoid (37) discussed after an energizing signal $t_1$ upon input of the signal $S_1$ while an energizing signal $t_2$ upon input of the signal $S_2$. A two-position directional control valve 36 of a solenoid actuated type is provided with the solenoid 37 which axially drives a movable valve element (not identified) in which the directional control valve 36 takes a first position 38 and a second position 39 in response to the energizing signals $t_1$, $t_2$. The directional control valve 36 is formed with ports E, F, G, H, I and J in which the ports F and I are respectively fluidly connected with the ports B and A of the pressure control valve 28, the ports E and H are respectively fluidly connected with fluid chambers e and f of the power cylinder 6, and the ports G and J are respectively fluidly connected with a first group of the hydraulic cylinders $C_1$, $C_3$ and a second group of hydraulic cylinders $C_2$, $C_4$. The fluid chambers e, f are divided by a piston (no numeral) fixed on the rack or piston rod 5. Thus, when the solenoid 37 is supplied with the energizing signal $t_1$, the directional control valve 36 takes the first position 38 in which the ports E and F are communicated with each other and the ports H and I are communicated with each other while closing the ports G and J. When the solenoid 37 is supplied with the energizing signal $t_2$, the directional control valve 36 takes the second position 39 in which the ports G and F are communicated with each other and the ports J and I are communicated with each other while closing the ports E and H.

The manner of operation of the vehicle steering control system of FIG. 1 will be discussed hereinafter.

When the vehicle cruises at a low speed lower than the level $V_1$, the vehicle speed sensor 32 outputs the signal $S_1$ to the control circuit 33. The control circuit 33 then outputs the energizing signal $t_1$ to the solenoid 37 depending upon the signal $S_1$ supplied thereto. Accordingly, the directional control valve 36 takes the first position 38, so that the ports E and F are communicated with each other and the ports H and I are communicated with each other while closing the ports G and J. In this state, when the steering wheel 37 is rotated in one direction, the rack 3 is driven in the vehicle body widthwise direction through the pinion gear 4, so that the flow passage area of the variable orifices a and c increases while the flow passage area of the variable orifices b and d decreases. Consequently, hydraulic fluid supplied under pressure from the pump 24 to the port P of the flow control valve 28 is fed to the power cylinder fluid chamber e through the variable orifice c, and the ports F and E, thus developing a steering assist power to assist turning the front wheels 9 and rotating the steering wheel 27 against a higher resistance between the front wheels 9 and road. At this time, the hydraulic fluid within the power cylinder fluid chamber f is forced out through the ports H and I of the directional control valve 36 to the port A of the pressure control valve 28, and thereafter returns to the reservoir tank 25 through the variable orifice a. Since the ports G and J are closed, no hydraulic fluid is supplied to the hydraulic cylinders $C_1$, $C_2$, $C_3$, $C_4$ from the pressure control valve 28, so that the rear wheel control means 21 is not operated.

Figure 2:
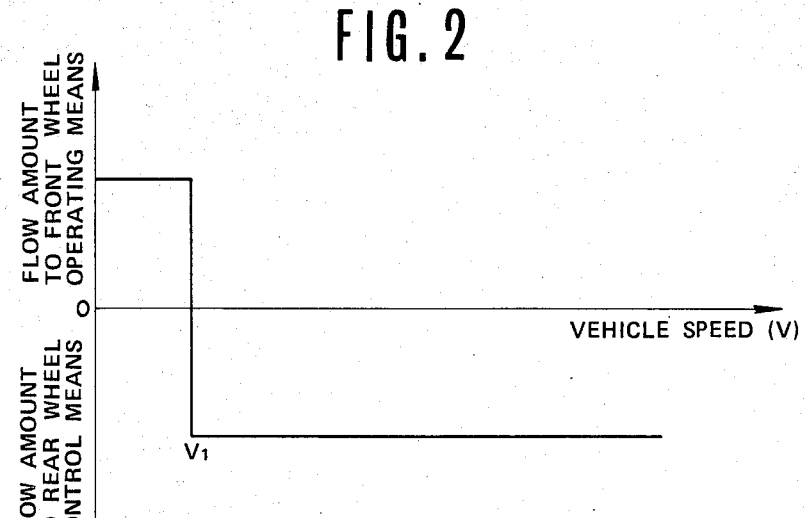
FIG. 2 is a graph showing the relationship between fluid flow amounts to a front wheel operating means and a rear wheel control means in the embodiment of FIG. 1 in terms of vehicle speed.

Conversely, when the steering wheel 27 is rotated in the opposite direction to the above-mentioned one direction, the hydraulic fluid supplied to the port P will flow reversely relative to the above so that the hydraulic fluid from the flow control valve 28 is supplied to the power cylinder fluid chamber f while the hydraulic fluid within the power cylinder fluid chamber e returns to the reservoir tank 25. Also in this state, a steering assist power is developed to assist turning front wheels 9 and rotating steering wheel 27 while no hydraulic fluid is fed to the hydraulic cylinders $C_1$, $C_2$, $C_3$, $C_4$. As a result, when vehicle speed V is within the low speed range, hydraulic fluid pressurized by the pump 24 is supplied to the power cylinder 6 of the front wheel operating means 10 but not supplied to the hydraulic cylinders $C_1$ to $C_4$ of the rear wheel control means 21, as shown in FIG. 2.

When the vehicle cruises at a high speed not lower than the level $V_1$, the vehicle speed sensor 32 outputs the signal $S_2$ to the control circuit 33. The control circuit 33 then outputs the energizing signal $t_2$ depending upon the signal $S_2$ supplied thereto. Accordingly, the directional control valve 36 takes the second position 39 so that the ports G and F are communicated with each other and the ports J and I are communicated with each other and so that the ports E and H are brought into communication with each other. In this state, when the steering wheel 27 is rotated in the above-mentioned one direction, the flow passage area of the variable orifices a and c increases while the flow passage area of the variable orifices b and d decreases. Consequently, the hydraulic fluid supplied to the port P of the pressure control valve is fed to the hydraulic cylinders $C_1$, $C_2$ through the variable orifice c, the port F and port G, thereby pivotally moving the rear suspension member 12 around the pin 17 elastically deforming the elastomeric insulators 13, 16. This causes the rear wheels 19 to turn in the same direction as the front wheels 9 thereby to reduce toe-out phenomena of the rear wheels 19 due to higher side force applied to the rear wheels 19, thus attaining cornering stability at high speeds. The hydraulic fluid within the hydraulic cylinders $C_2$, $C_4$ is forced out through the ports J and I to the port A, and thereafter returns through the variable orifice a to the reservoir tank 25. Since the ports F and I are respectively in communication with the ports G and J, no hydraulic fluid is supplied to the power cylinder 6. It is to be noted that the ports E and H are communicated with each other and the resistance between the front wheels 9 and road is lower, and consequently the rack 3 is readily driven in the vehicle body widthwise direction, thus easily turning the front wheels 9.

Conversely, when the steering wheel 27 is rotated in the opposite direction to the above-mentioned one direction, the hydraulic fluid supplied to the port P will flow reversely relative to the above so that the hydraulic fluid from the flow control valve 28 is supplied to the hydraulic cylinders $C_2$, $C_4$ while the hydraulic fluid within the hydraulic cylinders $C_1$, $C_3$ returns to the reservoir tank 25, thus turning the rear wheels 19 in the opposite direction to the above to attain vehicle stability during high speed cornering. Also in this state, no hydraulic fluid is supplied to the power cylinder 6 of the front wheel operating means 10. Thus, when vehicle speed is within the high speed range, the hydraulic fluid pressurized by the pump 24 is supplied to the hydraulic cylinders $C_1$ to $C_4$ of the rear wheel control means 21 but not supplied to the power cylinder 6 of the front wheel operating means 10, as shown in FIG. 2.

It will be understood that, with the embodiment of FIG. 1, hydraulic fluid supply to the rear wheel control means 21 is stopped during low vehicle speed cruising, and hydraulic fluid supply to the front wheel operating means 10 is stopped during high vehicle speed cruising, so that drive force for the pump 24 is reduced while improving fuel economy.

Figure 3:
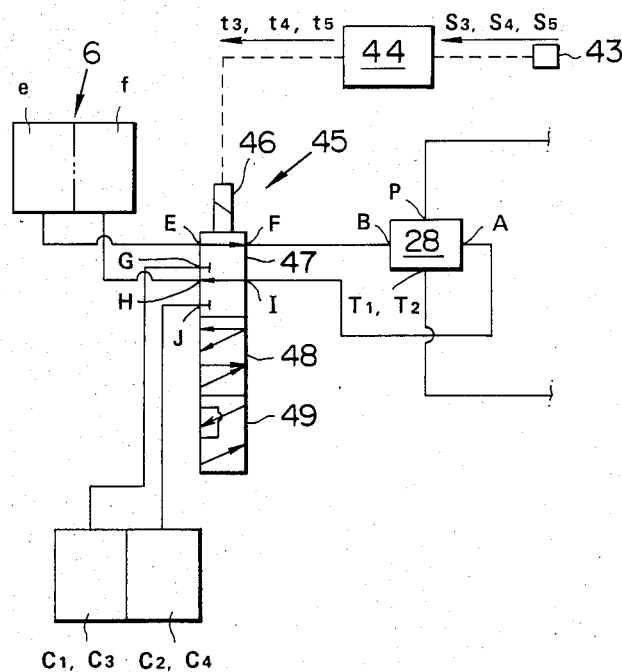
FIG. 3 is a schematic illustration of an essential part of a second, embodiment of the vehicle steering control system in accordance with the present invention.

FIG. 3 illustrates an essential part of a second embodiment of the vehicle steering control system which is similar to the first embodiment except for the type of the directional control valve and a control arrangement therefor. A vehicle speed sensor 43 is so adapted as to output to a control circuit 44 a signal $S_3$ when vehicle speed V is within the low speed range (lower than the predetermined vehicle speed level $V_1$), a signal $S_4$ when vehicle speed V is within a medium vehicle speed range (from the predetermined vehicle speed level $V_1$ to a predetermined vehicle speed level $V_2$), and a signal $S_5$ when vehicle speed is within a high vehicle speed range (higher than the predetermined vehicle speed level $V_2$). It will be understood that the vehicle speed level $V_2$ is higher than the vehicle speed level $V_1$. The control circuit 44 is so arranged as to output to a solenoid (46) discussed after an energizing signal $t_3$ when supplied with the signal $S_3$, an energizing signal $t_4$ when supplied with the signal $S_4$, and an energizing signal $t_5$ when supplied with the signal $S_5$.

A three-position directional control valve 45 is provided with the solenoid 46 for axially driving a movable valve element (not identified), and is formed with the ports E, F, G, H, I and J which are all the same as in first embodiment of FIG. 1. The directional control valve 45 is adapted as follows: when the solenoid 46 is supplied with the energizing signal $t_3$, it takes a first position 47 in which the ports E and F are communicated with each other and the ports H and I are communicated with each other while closing the ports G and J; when the solenoid 46 is supplied with the energizing signal $t_4$, it takes a second position 48 in which the ports E and F are communicated with each other, the ports G and F are communicated with each other, the ports H and I are communicated with each other, and the ports J and I are communicated with each other; and when the solenoid 46 is supplied with the energizing signal $S_5$, it takes a third position 49 in which the ports G and F are communicated with each other, the ports J and I are communicated with each other, and the ports E and H are communicated with each other.

Figure 4:
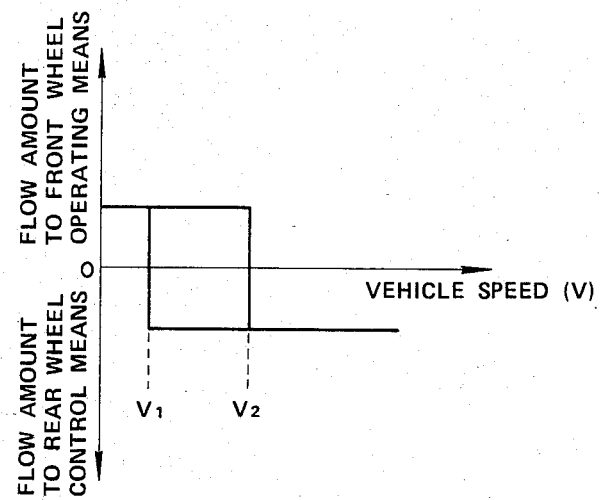
FIG. 4 is a graph similar to FIG. 2, but showing the relationship between the fluid flow amounts to the front wheel operating means and the rear wheel control means in the second embodiment of FIG. 3 in terms of vehicle speed.

Consequently, as shown in FIG. 4, when the vehicle cruises at a speed within the low vehicle speed range, hydraulic fluid from the pump 24 is supplied to the power cylinder 6 of the front wheel operating means 10 but not supplied to the hydraulic cylinders $C_1$ to $C_4$ of the rear wheel control means 21. When the vehicle cruises at a speed within the medium vehicle speed range, the hydraulic fluid is supplied to both the power cylinder 6 and the hydraulic cylinders $C_1$ to $C_4$. When the vehicle cruises at a speed within the high vehicle speed range, the hydraulic fluid is supplied to the hydraulic cylinders $C_1$ to $C_4$ but not supplied to the power cylinder 6. It will be understood that, with this second embodiment, during vehicle cornering at medium vehicle speeds, rotating the steering wheel 27 and turning the front wheels 9 are power-assisted while reducing toe-out phenomena of the rear wheels 19 thereby to attain vehicle cruising stability.

Figure 5:
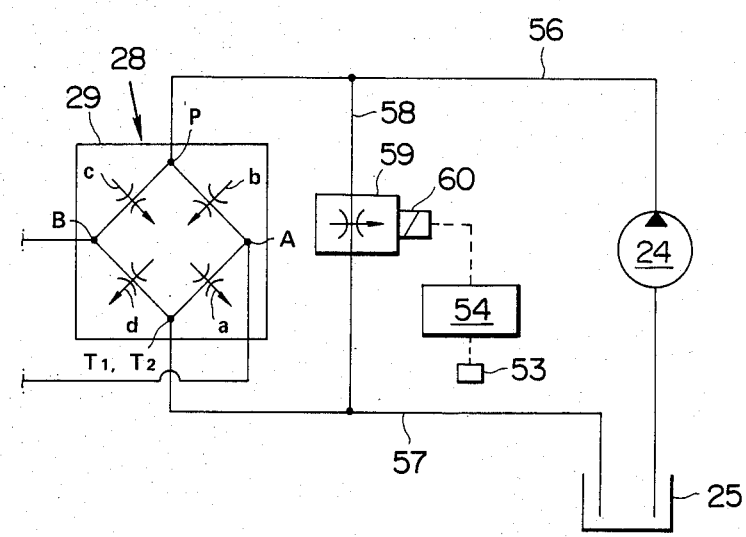
FIG. 5 is a schematic illustration of an essential part of a third embodiment of the vehicle steering control system in accordance with the present invention.

FIG. 5 illustrates an essential part of a third embodiment of the vehicle steering control system which is similar to the first embodiment except for means preventing shock during change-over operation of the directional control valve. In this embodiment, a vehicle speed sensor 53 is so adapted to output to a control circuit 54 such a pulse signal that the number of pulses (oscillations) per unit time increases as vehicle speed V approaches the abovementioned vehicle speed level $V_1$ so that the number of pulses becomes the maximum at the vehicle speed level $V_1$. The control circuit 54 is so arranged as to control a pulse signal to be supplied to a solenoid discussed after, in accordance with the pulse signal from the vehicle speed sensor 53. The control circuit 54 functions to increase the duty ratio of the pulse signal to be supplied to the solenoid as the number of the pulse per unit time in the signal from the vehicle speed sensor 53 increases so that the duty ratio becomes the maximum when the pulse number of the signal from the vehicle speed sensor 53 is the maximum.

As shown, a pipe 56 is provided to connect the port P of the pressure control valve 28 and the discharge port of the hydraulic pump 24. A pipe 57 is provided to connect the ports $T_1$, $T_2$ of the pressure control valve 28 and the reservoir tank 25. Interconnecting the pipes 56 and 57 is a bypass pipe 58 in which a variable aperture valve 59 is disposed as a flow control valve of a solenoid operated type. The variable aperture valve 59 is provided with the solenoid 60 and such adapted that the flow passage area thereof increases as the duty ratio of the pulse signal supplied to the solenoid 60 from the control circuit 54 increases so that the flow passage area becomes the maximum when the duty ratio is the maximum.

Figure 6:
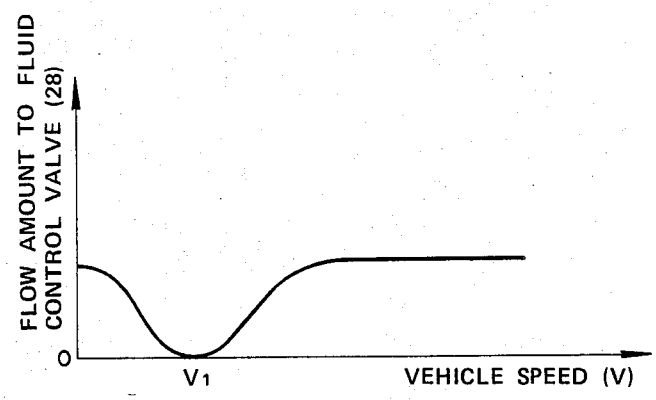
FIG. 6 is a graph showing the variation of the fluid flow amount to a fluid control valve in the third embodiment of FIG. 5 in terms of vehicle speed.
Figure 7:
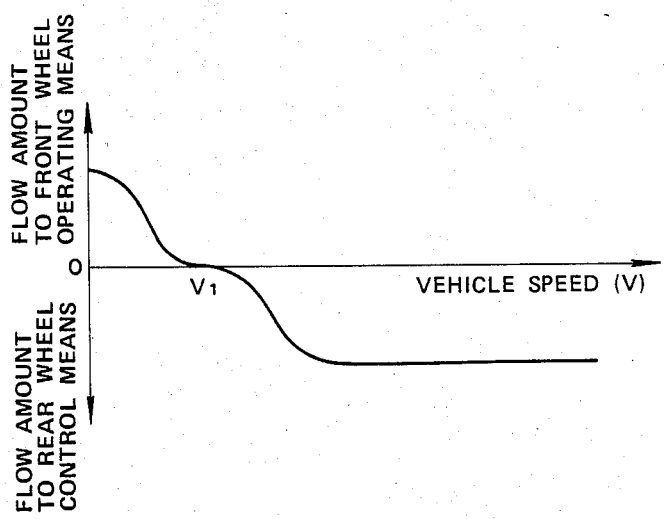
FIG. 7 is a graph showing the relationship between fluid flow amounts to the front wheel operating means and the rear wheel control means in the third embodiment of FIG. 6 in terms of vehicle speed.

Accordingly, as shown in FIG. 6 the fluid flow amount supplied to the port P from the pump 24 decreases as vehicle speed V approaches the value $V_1$ so that the fluid flow amount becomes zero when the vehicle speed becomes the value $V_1$. Consequently, when the vehicle speed V is changed from the low vehicle speed range (lower than the vehicle speed level $V_1$) to the high vehicle speed range (not lower than the vehicle speed level $V_1$) and vice versa, the fluid flow amount passing through the two-position directional control valve 36 decreases as vehicle speed approaches the value $V_1$ and becomes zero when vehicle speed becomes the value $V_1$, as shown in FIG. 7. As a result, the change-over operation of the two-position directional control valve 36 can be smoothly carried out without shock due to abrupt flow amount change.

What is claimed is:

1. A vehicle steering control system comprising:
   means for providing hydraulic fluid under pressure;
   a fluid control valve for controlling the hydraulic fluid form said hydraulic fluid providing means in response to rotation of a steering wheel;
   front wheel operating means for controllably power assisting steering of front wheels under the influence of the hydraulic fluid controlled by said fluid control valve;
   rear wheel control means for controllably compliance steering rear wheels under the influence of the hydraulic fluid controlled by said fluid control valve; and
   directional control means actuated in response to vehicle speed for selectively directing the hydraulic fluid controlled by said fluid control valve to said front wheel operating means for providing power assisted steering at a low vehicle speed range and to said rear wheel control means for providing compliance steering at a higher vehicle speed range.

2. A vehicle steering control system as claimed in claim 1, wherein said directional control means includes a directional control valve having a first position to establish fluid communication between said fluid control valve and said front wheel operating means, and a second position to establish fluid communication between said fluid control valve with said rear wheel control means, and means for putting said directional control valve into one of said first and second positions in accordance with vehicle speed.

3. A vehicle steering control system as claimed in claim 2, wherein said putting means includes a vehicle speed sensor for outputting a first vehicle speed signal when vehicle speed is within a first vehicle speed range while a second vehicle speed signal when vehicle speed is within a second vehicle speed range, a control circuit for outputting a first operating signal upon receiving said first vehicle speed signal and a second operating signal upon receiving said second vehicle speed signal, and an actuator for actuating said directional control valve to take said first position upon receiving said first operating signal and said second position upon receiving said second operating signal.

4. A vehicle steering control system as claimed in claim 3, wherein said second vehicle speed range corresponds to the higher vehicle speed range and said first vehicle speed range corresponds to the low vehicle speed range.

5. A vehicle steering control system as claimed in claim 2, wherein said directional control valve has a third position to establish fluid communication of said fluid control valve with both said front wheel operating means and said rear wheel control means when vehicle speed is within a third intermediate vehicle speed range, and wherein said putting means is arranged to put said directional control valve into one of said first, second and third positions in accordance with vehicle speed.

6. A vehicle steering control system as claimed in claim 5, wherein said putting means includes a vehicle speed sensor for outputting a first vehicle speed signal when vehicle speed is within a first vehicle speed range, a second vehicle speed signal when vehicle speed is within a second vehicle speed range, and a third vehicle speed signal when vehicle speed is within a third vehicle speed range, a control circuit for outputting a first operating signal upon receiving said first vehicle speed signal, a second operating signal upon receiving a second vehicle speed signal, and a third operating signal upon receiving said third vehicle speed signal, and an actuator for actuating said directional control valve to take said first position upon receiving said first operating signal, said second position upon receiving said second operating signal, and said third position upon receiving said third operating signal.

7. A vehicle steering control system as claimed in claim 3, further comprising means for reducing amount of the hydraulic fluid to be supplied from said hydraulic fluid providing means to said fluid control valve when vehicle speed shifts from said first vehicle speed range to said second vehicle speed range.

8. A vehicle steering control system as claimed in claim 7, wherein said hydraulic fluid amount reducing means enables to make the amount zero when the vehicle speed shifts from said first vehicle speed range to said second vehicle speed range.

9. A vehicle steering control system as claimed in claim 8, wherein said hydraulic fluid amount reducing means includes a bypass line fluidly connected to a line connecting said fluid control valve with said hydraulic fluid providing means, a variable aperture valve disposed in said bypass line, means for controlling flow passage area of said variable aperture valve in accordance with vehicle speed.

10. A vehicle steering control system as claimed in claim 9, wherein said control means includes a vehicle speed sensor for outputting a first pulse signal whose number of pulses per unit time increases as vehicle speed approaches a predetermined vehicle speed, a control circuit for outputting a second pulse signal whose duty ratio increases as the pulse number of said first pulse signal increases, and a solenoid for controlling the flow passage area of said variable aperture valve in response to said second pulse signal, said flow passage area increasing as the duty ratio of said second pulse signal increases.

11. A vehicle steering control system as claimed in claim 2, wherein said front wheel operating means is a power steering system and includes a power cylinder fluidly connected with said directional control valve and drivingly connected to the front wheels.

12. A vehicle steering control system as claimed in claim 2, wherein said wheel control means is a compliance steer control system and includes a hydraulic cylinder which is fluidly connected with said directional control valve and has a piston section drivingly connected with a rear suspension member to which the rear wheels are connected.

13. A vehicle steering control system as claimed in claim 1, wherein said fluid control valve is incorporated with a steering gear operatively connected with said front wheel operating means.

* * * * *